United States Patent [19]
Armstrong et al.

[11] Patent Number: 5,984,282
[45] Date of Patent: Nov. 16, 1999

[54] PACKED LIQUID-VAPOR CONTACT COLUMN HAVING AT LEAST ONE BAND OF PACKING SHEETS SURROUNDING A CENTRAL CORE OF PACKING SHEETS

[75] Inventors: Phillip Andrew Armstrong, Orefield, Pa.; Mohammad Ali Kalbassi, Walton-on-Thames; Derek Miller, Guildford, both of United Kingdom

[73] Assignee: Air Products and Chemicals, Inc., Allentown, Pa.

[21] Appl. No.: 09/009,094

[22] Filed: Jan. 20, 1998

[51] Int. Cl.⁶ ........................................................ B01F 3/04
[52] U.S. Cl. ..................... 261/112.2; 261/112.1; 261/DIG. 72
[58] Field of Search .................. 261/110, 112.1, 261/112.2, DIG. 72, DIG. 11, 111

[56] References Cited

U.S. PATENT DOCUMENTS

| | | | |
|---|---|---|---|
| 3,109,876 | 11/1963 | Moeller | 261/112.2 |
| 3,423,268 | 1/1969 | Rahm et al. | 261/112.2 |
| 5,486,318 | 1/1996 | McKeigue et al. | 261/112.2 |
| 5,725,810 | 3/1998 | Brunner et al. | 261/112.2 |

*Primary Examiner*—David A. Simmons
*Assistant Examiner*—Robert A. Hopkins
*Attorney, Agent, or Firm*—Willard Jones II

[57] ABSTRACT

A liquid-vapor contact column is packed with at least one layer formed of a plurality of structured packing sheets orientated to provide liquid-vapor contact in the axial direction of the column and arranged so that, viewed in the axial direction of the column, packing sheets in the body of the layer are in one or more sections in which at least one band surrounds a central core, said band being formed of segments in which the packing sheets in each segment extend rectilinearly in a different direction to those in the adjacent segments in the same band. The packing sheets in the body of the or each layer can be arranged in a plurality of abutting sections or in a single section.

28 Claims, 6 Drawing Sheets

PACKED LIQUID-VAPOR CONTACT COLUMN HAVING AT LEAST ONE BAND OF PACKING SHEETS SURROUNDING A CENTRAL CORE OF PACKING SHEETS

TECHNICAL FIELD OF THE INVENTION

The present invention relates to the packing of a liquid-vapor contact column and provides a column packed with structural packing sheets arranged in a novel manner. It has particular, but not exclusive, application to columns, especially for cryogenic air separation, at a location, such as off-shore, subject to movement causing the column to sway or tilt from the vertical.

BACKGROUND OF THE INVENTION

It is well known that the use of structured packing in distillation columns has many advantages where low pressure drop is important. However, packed column performance is very dependent on creating and maintaining a balance between the downward flow of liquid and upward flow of vapor locally in the packing. The distribution of the liquid and vapor within the packing is influenced by the initial presentation of these fluids to the packing, and the particular characteristics of the packing.

The structured packing typically consists of sheets of corrugated metal, which are bound together in sections, forming a series of criss-crossing open channels. The sections abut each other to form a layer filling the column cross-section. Typically, several layers of sectioned structured packing are stacked on top of one another to an appropriate height to create a packed column. Each layer has a single direction to which the packing sheets and the channels formed by them are parallel. The liquid and vapor spread more easily in the direction of the channels within a given layer and, by following the channels, the fluids from different parts of the column can mix and congregate within the packing. Typically, each layer is angularly orientated by, for example 90°, relative to adjacent layers to promote mixing.

In both stationary and moving columns, difficulties arise in maintaining uniform liquid and vapor distribution within structured packing, due to the migration of the fluids across the column cross-section following the channels in the packing. The migration tends to create local imbalances of the liquid and vapor flows, leading to poor distillation performance. One manifestation of this phenomenon is the well-known relationship between mass transfer efficiency and structured packed column diameter: small columns tend to have higher mass transfer rates than larger columns. In theory, the rapid mixing of the entire column contents across the cross-section occurs more readily in a small column, thus mitigating the effects of the local flow imbalances. Non-stationary column installations, such as off-shore applications, pose special problems in maintaining uniform liquid distribution. The periodic tilting of the column tends to force the liquid toward the walls of the column, creating severe flow imbalances between the liquid and vapor in the packing.

An alternative to structured packing is spiral-wound packing, which is composed of a continuous sheet of corrugated packing which is wound on a mandrel, starting from the inside of a column and winding to the outside of the column. A continuous, spiral path for liquid and/or vapor is created between the corrugated sheets as they wind from the inside to the outside of the column. Spiral-wound packed columns have similar difficulties in maintaining flow uniformity, but, because transverse mixing may not occur as readily, may not enjoy the small-column performance enhancement observed in structured packed systems. Furthermore, spiral-wound packed columns have a spiral pathway to the wall of the column which may lead to accumulation of liquid there, especially in a shipboard application. However, a spiral-wound packing may have advantages over a structured packing for some applications because of reduced migration of the liquid and vapor radially in the column.

The prior art attempts to maintain the local balance between liquid and vapor flows within the structured packing by partitioning a layer of packing in a large column into smaller sections. Partitioning forces the liquid flowing within a partitioned section to stay within that section, thus maintaining the balance between liquid and vapor flows.

Figure 1A:
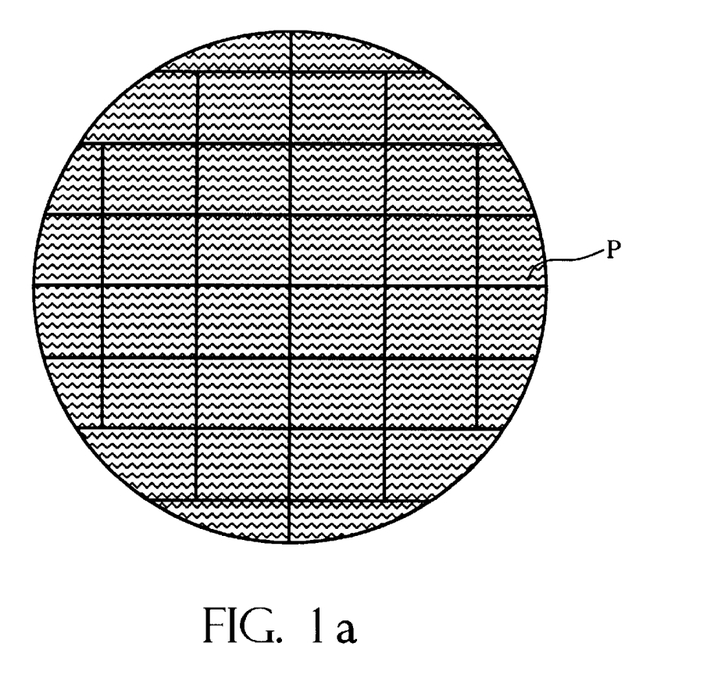
FIG. 1a is a schematic cross-section of a column packed with structured packing sheets arranged in sections delimited by physical partitions in accordance with U.S. Pat. No. 5,486,318.
Figure 1B:
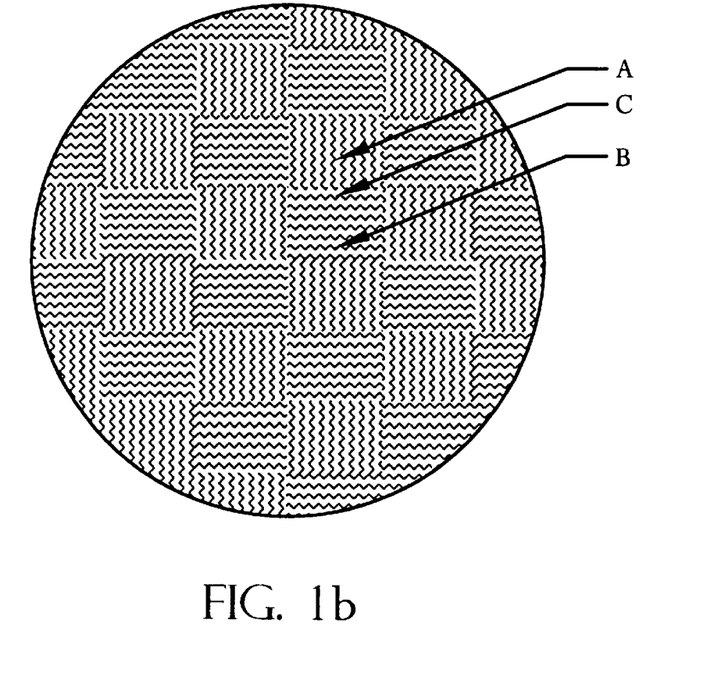
FIG. 1b is a schematic cross-section of a column packed with structured packing sheets arranged in sections delimited by packing orientation in accordance with U.S. Pat. No. 5,486,318.

U.S. Pat. No. 5,486,318 (McKeigue and Krishnamurthy) teaches variations of packing partitioning by the use of physical partitions or by the use of varying packing orientation as a means of partitioning. These variations are depicted in FIG. 1. The physical partition P shown in FIG. 1a is a perforated plate, with perforations large enough that some vapor can pass through, but too small for a significant amount of liquid to flow through. The second variation, shown in FIG. 1b, requires that each section of packing abuts an adjacent section of packing perpendicularly, so that the channels in the packing sheets in Section A, for example, are bordered by a single packing sheet, Sheet C, of abutting Section B. The channels of Sheet C run in a perpendicular plane to those in Section A. Although not pointed out in U.S. Pat. No. 5,486,318, when liquid runs down the channels from several sheets in Section A toward Section B, the liquid will tend to accumulate on a single sheet, Sheet C. The accumulation of liquid from several sheets onto one sheet results in local channelling, and thereby degrades the mass transfer performance of the column.

It is an object of the present invention to provide an arrangement of packing sheets which permits of uniform liquid-vapor contact in a packed column during sway or tilt such as that encountered by a shipboard cryogenic air separation distillation column.

SUMMARY OF THE INVENTION

The present invention comprises an improvement in a liquid-vapor contact column comprising a hollow column packed with at least one layer formed of a plurality of structured packing sheets orientated to provide liquid-vapor contact in the axial direction of the column. The improvement consists in that, viewed in the axial direction of the column, packing sheets in the body of the layer are arranged in one or more sections in which at least one band surrounds a central core, said band being formed of segments in which the packing sheets in each segment extend rectilinearly in a different direction to those in the adjacent segments of the band.

The sections of structured packing are arranged in a novel way to partition the column into several smaller columns and enhance the performance of the column relative to the prior art.

BRIEF DESCRIPTION OF THE DRAWINGS

FIG. 2b is a schematic cross-section of a column packed with structured packing sheets arranged in the same sections as FIG. 2a but rotated through 45 degrees compared with the orientation in FIG. 2a;

FIG. 3b shows the superposition of the cross-section of FIG. 3a on the cross-section of FIG. 2a;

DETAILED DESCRIPTION OF THE INVENTION

The present invention provides an improvement in a liquid-vapor contact column comprising a hollow column packed with at least one layer formed of a plurality of structured packing sheets orientated to provide liquid-vapor contact in the axial direction of the column, which improvement is that, viewed in the axial direction of the column, packing sheets in the body of the layer are arranged in one or more sections in which at least one band surrounds a central core, said band being formed of segments in which the packing sheets in each segment extend rectilinearly in a different direction to those in the adjacent segments of the same band.

It will be understood that near the wall of the column the packing sheets usually cannot be arranged in the same manner as in the body of the column and accordingly the packing segments will be made to conform to the column wall.

The core can be of any shape complementary to the surrounding band segments but usually the cross-section of said core will be a polygon with at least 4 sides. In this connection, all references herein to cross-sections are as viewed in the axial direction of the column unless it is stated otherwise. Preferably, the polygon is regular and it is presently more preferred that it has an even number of sides and especially that it is a square or regular hexagon.

The cross-section of each band segment can be any shape complementary to the core or, in the case of a second or subsequent band, to the next innermost band. However, when the core is of polygonal cross-section, it is presently preferred that the segments are of trapezoidal cross-section.

The packing sheets in the segments can extend in any rectilinear direction provided that is different from that in adjacent segments of the same band but, when the core is a polygon, it is presently preferred that the packing sheets extend either perpendicular or, especially, parallel to the adjacent side of the core. The direction relative to the core can be different in different sections of the same band or can be different in adjacent sections of different bands, although it is presently preferred that the direction is the same in adjacent sections of different bands. In one embodiment, the packing sheets in alternate segments of the same band extend parallel to the adjacent side of the polygonal core and the packing in the intervening segments extend perpendicular to the adjacent side of the core.

Conveniently, each segment of a band is identical with the complementary segments of the band.

Each segment can be bounded at its sides by an axially extending peripheral wall but the segments usually are delimited merely by the packing orientation.

The packing sheets in the body of the or each layer can be arranged in a plurality of abutting sections or in a single section. In either arrangement, but especially in the latter, there can be two or more bands concentrically surrounding the core. The former arrangement partitions the column locally into small areas, and is suited to enhancing the performance of any packed column, while the later partitions the column radially, and is particularly suited to enhancing the performance of a shipboard or similarly mounted column which tilts from side-to-side periodically.

The column can be packed with two or more layers of packing sheets arranged in accordance with the present invention and angularly orientated so that the segments of each layer are not axially aligned with the corresponding segments of the adjacent layer(s). Suitable, viewed in the axial direction of the column, the packing sheets in the body of each layer are arranged in a plurality of abutting said sections and the centers of at least some cores of each layer are coaxially aligned with centers of cores in the adjacent layer(s). In order to achieve such alignment, the size of the sections can vary between adjacent layers with the shape and pattern of the core and segments common to the layers.

In one presently preferred embodiment, the column shell is packed with at least one layer formed of a plurality of structured packing sheets orientated to provide liquid-vapor contact in the axial direction of the column, the packing sheets in the body of each layer being arranged so that, viewed in the axial direction of the column, there is a plurality of abutting sections in each of which at least one band surrounds a central regular polygonal core, said band being formed of segments of trapezoidal cross-section identical with the complementary segments of the band and the packing sheets in each segment extend rectilinearly in a different direction to those in the adjacent segments of the band.

In another presently preferred embodiment, the column shell is packed with at least one layer formed of a plurality of structured packing sheets orientated to provide liquid-vapor contact in the axial direction of the column, the packing sheets in the body of each layer being arranged so that, viewed in the axial direction of the column, the packing sheets in each layer are arranged in one or more bands concentrically surrounding a central regular polygonal core, said band being formed of segments of trapezoidal cross-section identical with the complementary segments of the band and in which the packing sheets in each segment extend rectilinearly in a different direction to those in the adjacent segments of the band.

In a further presently preferred embodiment, the column shell is packed with at least one layer formed of a plurality of structured packing sheets orientated to provide liquid-vapor contact in the axial direction of the column, the packing sheets in the body of each layer being arranged so that, viewed in the axial direction of the column, packing sheets in each layer are arranged in two or more bands concentrically surrounding a central regular hexagonal core, all said bands being formed of identical segments of irregular hexagonal cross-section symmetrical about a radial direction from the core center.

In another presently preferred embodiment, the column shell is packed with at least one layer formed of a plurality of structured packing sheets orientated to provide liquid-vapor contact in the axial direction of the column, the packing sheets in the body of each layer being arranged so that, viewed in the axial direction of the column, packing sheets in each layer are arranged in one or more bands concentrically surrounding a central regular polygonal core having an even number of sides, said band being formed of segments of trapezoidal cross-section alternating with segments of rectangular cross-section, said trapezoidal segments being identical with the other trapezoidal segments of the band and having the packing sheets extending parallel to the sides of the core, and said rectangular segments being identical with the other rectangular segments of the band and having packing sheets extending perpendicular to the sides of the core.

The following is a description, by way of example only and with reference to the accompanying drawings, of presently preferred embodiments of the present invention.

Figure 2A:
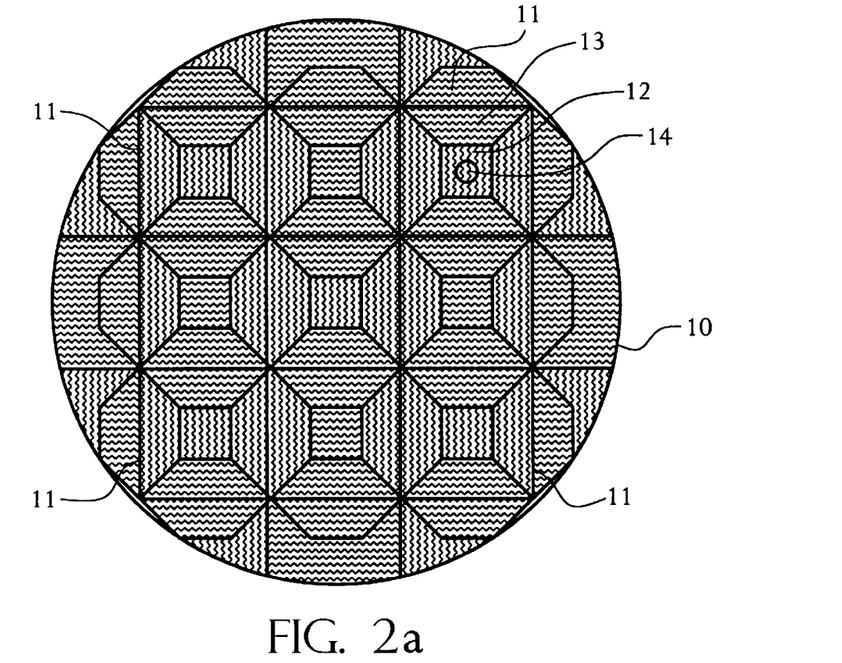
FIG. 2a is a schematic cross-section of a column packed with structured packing sheets arranged in sections in accordance with a presently preferred embodiment of the present invention.

Referring first to FIG. 2a, a column shell 10 is packed with layers of corrugated packing sheets (indicated by wavy lines) to form a cryogenic air separation distillation column. In the body of each layer, the packing sheets are arranged in several abutting sections 11 of square cross-section each consisting of a square core 12 surrounded by a band of four trapezoidal segments 13. The segments 13 and cores 12 are demarcated by heavy lines and may be delimited by physical partitions placed at none, some, or all of the intersections, especially between adjacent sections. As indicated by the wavy lines, the packing sheets in each segment 13 extend in the rectilinear direction of the adjacent side of the core 12.

Liquid and vapor entering the boundaries of each section 11 would not leave the section through an horizontal plane, because all the channels of the packing sheets on the boundary run parallel to the periphery of the boundary.

Figure 2B:
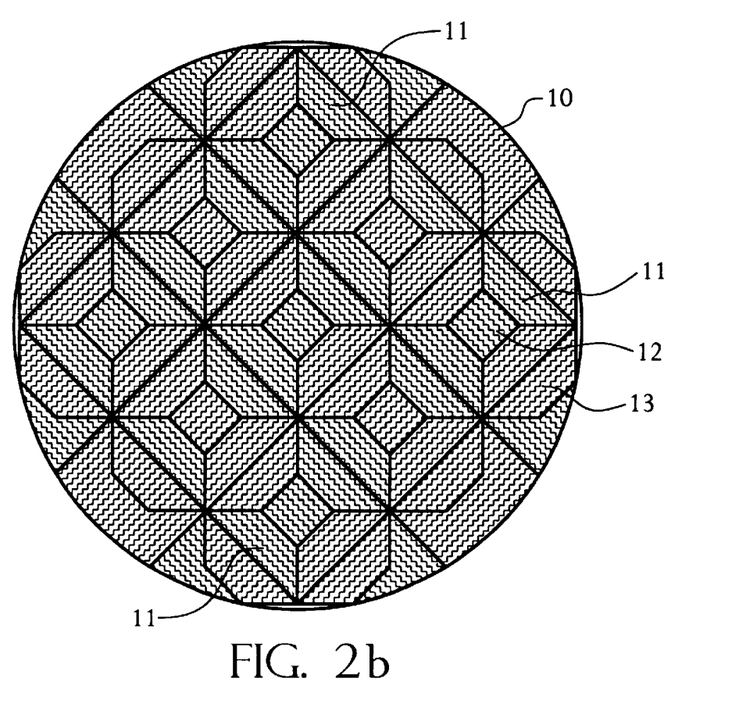
Figure 3A:
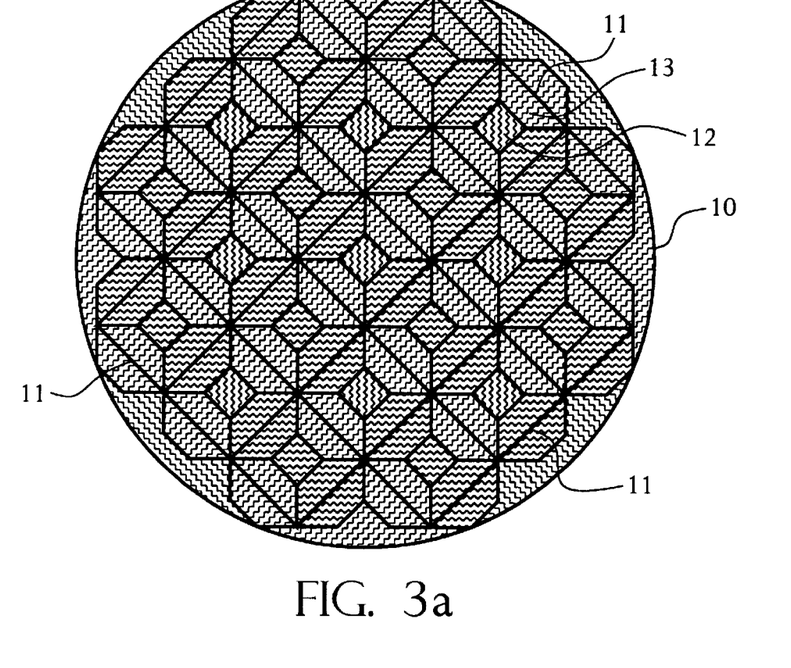
FIG. 3a is a schematic cross-section of a column packed with structured packing sheets arranged in sections in the same manner as FIG. 2b but with smaller cores and segments.
Figure 3B:
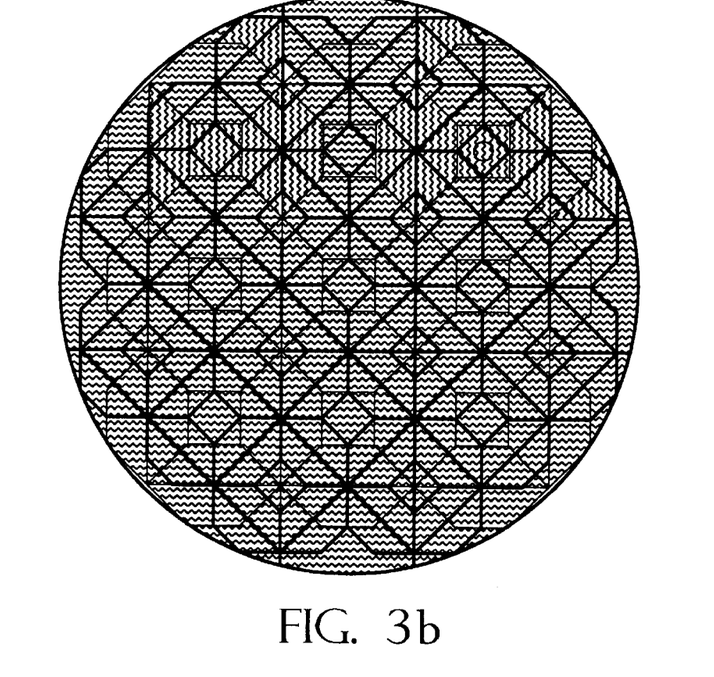

It is recognized that, in considering layer-to-layer rotations, only the core 12 of each section 11 can be re-oriented on each layer transition and still be able to maintain confinement of the liquid and vapor to an individual cross-sectional area extending from the top of the column packing to its bottom. However, varying degrees of fluid confinement can be provided by (a) no re-orientation of the trapezoidal segments 13 and 90° re-orientation of the square cores 12 on adjacent layers; (b) 45° re-orientation of the trapezoidal segments 13 and 45° re-orientation of the square cores 12 on adjacent layers, or (3) 45° rotation of layers while maintaining the geometric center 14 of each section 11 in common among all the layers. According to option (a), the segmentation shown in FIG. 2a would be superimposed on itself in going from layer-to-layer, so that all the centers 14 for each layer are directly over each other. The sheets in the core 12 would change directions by 90° at each layer transition. In option (b), each section 11 is rotated 45°, and the centers 14 for every other layer are aligned, but the centers 14 for adjacent layers are shifted relative to each other. FIG. 2b shows the orientation of a layer rotated 45° relative to the layer in FIG. 2a. Option (3), shown in FIGS. 3, also involves a 45° rotation, but requires that the core 12 and segments 14 of all sections 11 in one layer are reduced in size compared with the adjacent layer(s), so that the geometric centers 14 in rotated and non-rotated layers will align with each other vertically. FIG. 3a shows a layer with individual elements reduced in size and rotated by 45° relative to the layer in FIG. 2a, while FIG. 3b shows the superposition of FIGS. 2a and 3a. As mentioned above, only option (a), FIG. 2a with 90° rotations of the cores 12 at each layer transition, is adequate to create the full partitioning of the fluids over the length of the packing in the column.

A variation on the rotation option of FIG. 2a involves the use of physical partitions at some or all of borders of the trapezoidal segments 13; each layer can have many small partitions, or more than one layer can make use of a few partitions which extend two or more layers into the packed column section up to a maximum length coinciding with the packed height of the column.

To improve the performance of a conventional packed column, the area of the sections 11 is less than 1 m$^2$, preferably 0.3–0.6 m$^2$.

Figure 4:
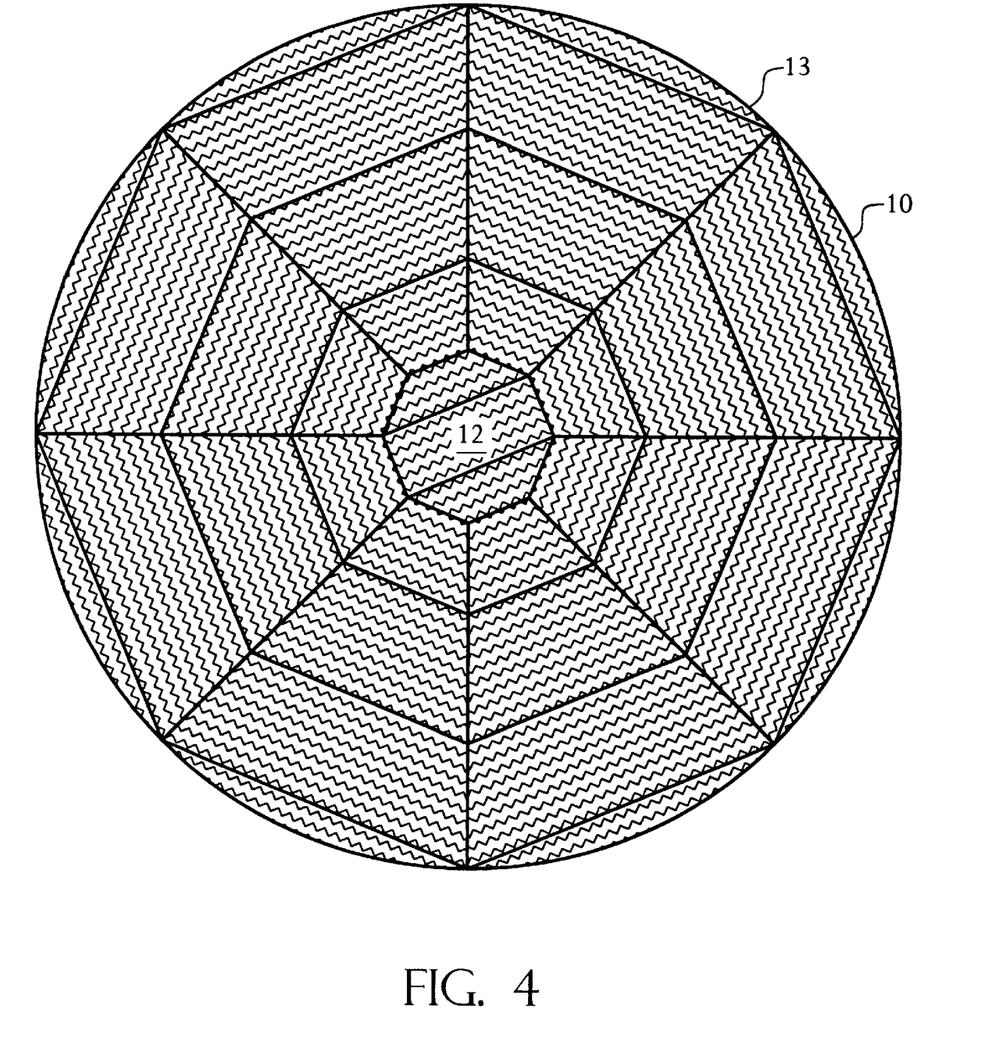
FIG. 4 is a schematic cross-section of a column packed with structured packing sheets arranged in sections in accordance with another embodiment of the present invention.

An alternative polygonal arrangement of packing sheets to partition the column radially is shown in FIG. 4. In this arrangement a regular hexagonal core 12 (formed of a central rectangular portion and two adjacent trapezoidal portions) is surrounded by three concentric bands of trapezoidal segments 13. Physical partitions may be placed at none, some, or all of the intersections between adjacent segments. As in the arrangement of FIGS. 2 and 3, the arrangement is effective to maintain uniform liquid-vapor contact when the column 10 is tilting back and forth as in a shipboard application.

In the embodiment illustrated in FIG. 4, the packing sheets are arranged within the confines of a series of general, N-sided polygonal bands of increasing size across a column, where N is an integer, preferably even, and preferably in the range 4–64. The polygons are located symmetrically about the center of the column. Near the wall of the column the polygonal shape cannot be retained, and the packing segments are made to conform to the column wall. The orientation of the packing sheets within each segment is tangential to a circle concentric with the column, except near the center of the column, where the core is filled by a series of small segments of arbitrary orientation. Each layer can be rotated, if desired, by some angle relative to adjacent layers, preferably an angle $\pi/N$ in radians. The area of the largest packing segments in a polygonal arrangement is expected to significantly exceed the area of the individual sections of the embodiment illustrated in FIGS. 2 and 3 for the same diameter column.

Figure 5A:
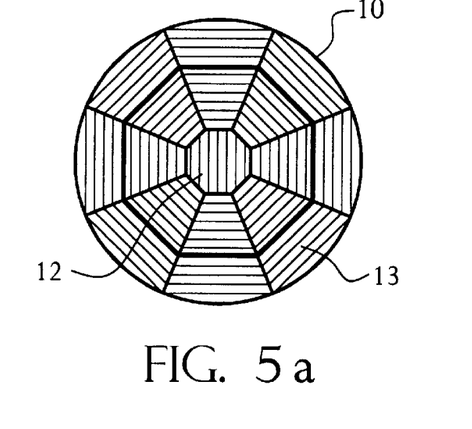
FIG. 5a is a schematic cross-section of a column packed with structured packing sheets arranged in sections in accordance with another embodiment of the present invention.

FIG. 5a shows a packing sheet arrangement similar to that of FIG. 4 but in which the core 12 is partitioned.

Figure 5B:
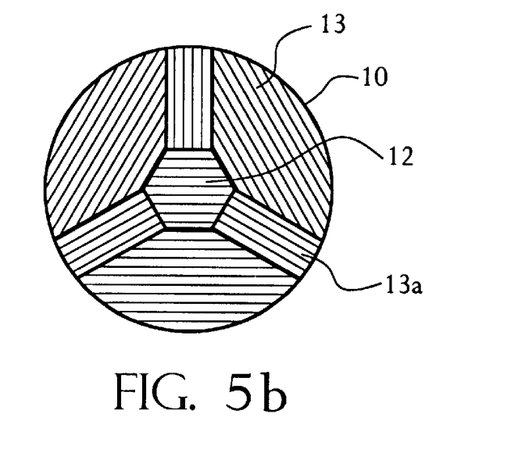
FIG. 5b is a schematic cross-section of a column packed with structured packing sheets arranged in sections in accordance with another embodiment of the present invention.

FIG. 5b shows a packing sheet arrangement in which the core 12 is a regular hexagon and is surrounded by one or more bands formed of rectangular segments 13a alternating with generally trapezoidal segments 13. The packing sheets in segments 13a extend perpendicularly of the core whereas, as in the other illustrated embodiments, those in segments 13 extend parallel to the adjacent side of the core 12.

Figure 5C:
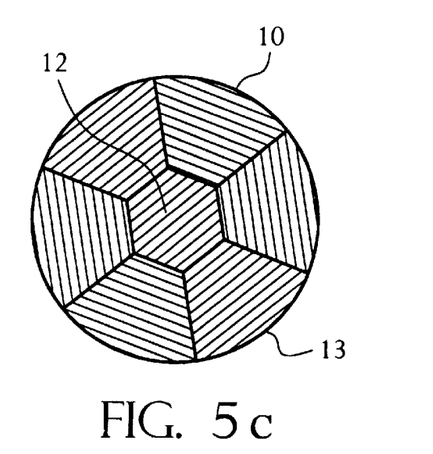
FIG. 5c is a schematic cross-section of a column packed with structured packing sheets arranged in sections in accordance with another embodiment of the present invention.

FIG. 5c shows a packing sheet arrangement similar to that of FIG. 5a but in which the core 12 is a regular hexagon and is surrounded by one or more bands of trapezoidal segments 13.

Figure 5D:
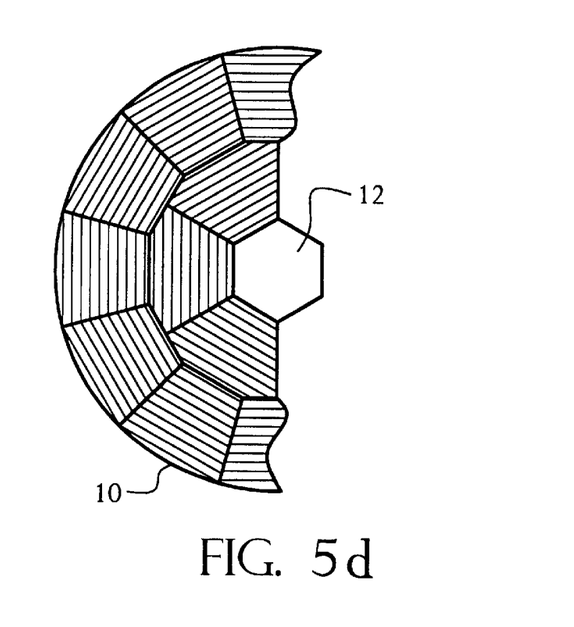
FIG. 5d is a schematic partial cross-section of a column packed with structured packing sheets arranged in sections in accordance with another embodiment of the present invention.

FIG. 5d shows a packing sheet arrangement in which the core 12 is a regular hexagon and is surrounded by two or more bands each formed of irregular hexagons having a base of equal length to the core sides and being symmetrical about a radius from the core center.

Figure 6:
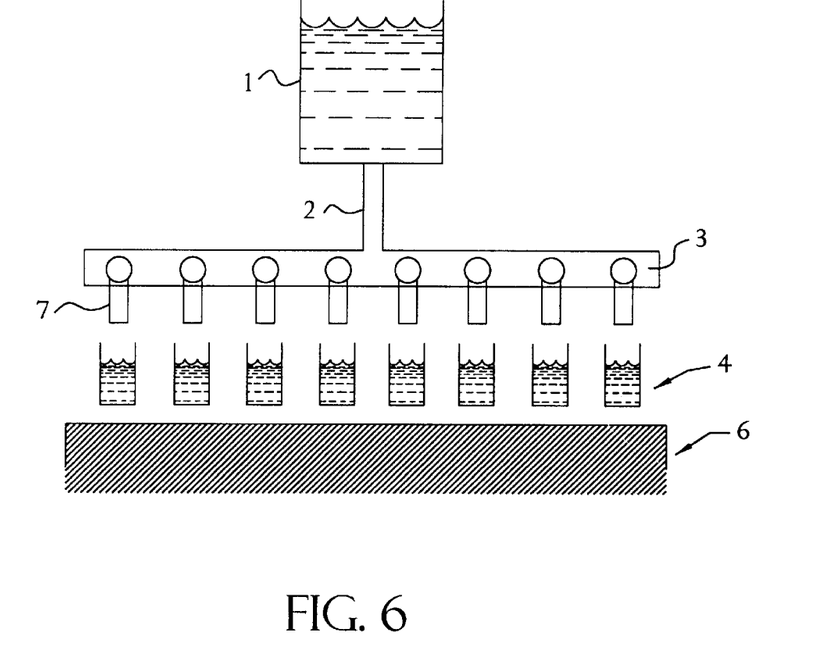
FIG. 6 is a schematic representation of a liquid distributor preferred for use with columns in accordance with the present invention.
Figure 7:
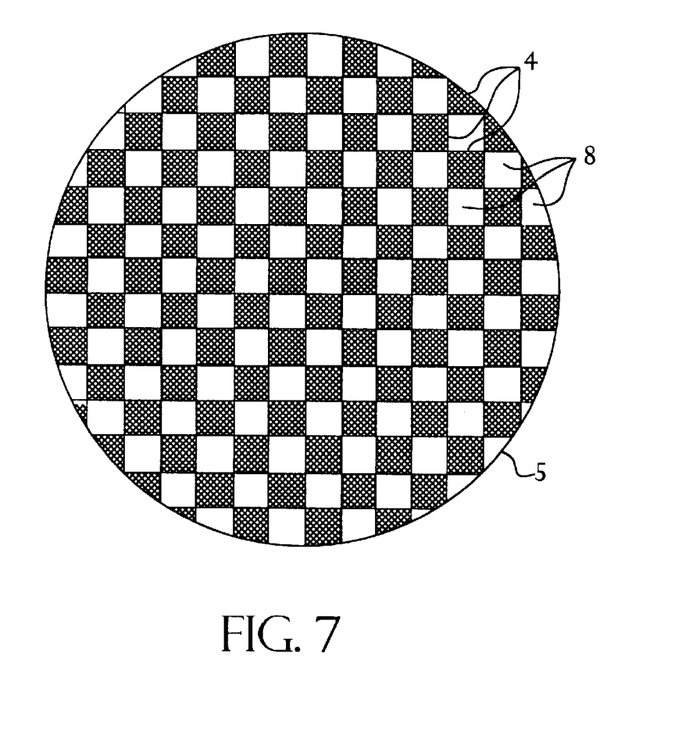
FIG. 7 is a plan view of the liquid distribution plate of the distributor of FIG. 6.

FIGS. 6 and 7 show a liquid distributor preferred for use with columns in accordance with the present invention. The distributor is in accordance with a preferred embodiment of that forming the subject of our co-pending U.S. patent application Ser. No. 09/009,093, pending of the same filing date, the disclosure of which is incorporated into the present application by this reference.

Referring to FIG. 6, the distributor comprises a header tank 1 from which a main distribution pipe 2 extends for the delivery of liquid from the header tank. A plurality of pipe branches 3 extend from the main pipe 2 over rows of reservoir cells 4 in a liquid distribution plate 5 (see FIG. 7) located above structural packing 6 in a distillation column (not shown) of a cryogenic air separation unit mounted on a ship (not shown). Each pipe branch 3 has a series of spaced delivery tubes 7 individually aligned with a respective reservoir cell 4 of the respective row.

As shown in FIG. 7, the distribution plate 5 is a circular disc covering the whole cross-section of the column above the packing and having identical bores (4,8) of square cross-section formed therein in uniform criss-cross rows. Alternate bores 8 (vapor riser passages) are open at both the top and bottom to permit the free flow of vapor therethrough and the remaining bores 4 (reservoir cells) are blind being closed at their bases except for a central hole (not visible) permitting limited flow of liquid therethrough.

EXAMPLE

A distributor as described above with reference to FIGS. 6 & 7 is fitted to a shipboard cryogenic air separation column of 2.9 m diameter packed with structured packing sheets as described below. The column produces about 1000 tons/day (900 tonnes) of oxygen with a liquid flowrate of 0.042 m$^3$/s and a vapor flowrate of 5.04 m$^3$/s. The distributor is dimensioned for ±12° tilting of the column from the vertical with a 15 second period and an average list of 2° from the vertical.

Each reservoir cell in the distribution plate is about 0.050 m×0.050 m square and 0.38 m tall with a hole size of 0.005 m, yielding a 30 second inventory of liquid. The height of the liquid head in the header tank is 1.2 m and the total height of the distributor system is about 3 m. This system gives an overall flow variation of ±5% during operation.

In contrast, if the same column were fitted with a conventional pipe distributor, a liquid head of 7.5 m would be required to achieve ±5% flow variation. The total height of the conventional pipe distributor would be about 9 m (i.e. about 3 times more than is required by the exemplified distributor of the present invention).

The column is packed with packing sheets arranged, in the manner as shown in FIG. 2a, in 16 identical square sections each of 0.52 m sides and formed of a square core of 0.12 m sides surrounded by 4 trapezoidal segments consisting of 20–40 sheets of packing each, depending on corrugation height. 8 Trapezoidal elements are arranged around the periphery of the column, with some odd-shaped elements near the wall to fill in the circular cross-section. The cores are rotated by 90° on each successive layer, while the trapezoidal segments are not rotated.

It will be understood by those skilled in the art that the invention is not restricted to the specific details described above and that numerous modifications and variation can be made without departing from the scope and equivalence of the following claims.

What we claim is:

1. In a liquid-vapor contact column comprising a hollow column packed with at least one layer formed of a plurality of structured packing sheets orientated to provide liquid-vapor contact in the axial direction of the column, the improvement consisting in that, viewed in the axial direction of the column, packing sheets in the body of the layer are arranged in one or more sections in which at least one band surrounds a central core, said band being formed of segments in which the packing sheets in each segment extend rectilinearly in a different direction to those in the adjacent segments in the same band.

2. The column according to claim 1 wherein, viewed in said axial direction, the cross-section of said core is a polygon with at least 4 sides.

3. The column according to claim 2 wherein said cross-section is a regular polygon.

4. The column according to claim 2 wherein said cross-section is a square.

5. The column according to claim 2 wherein said cross-section is a regular hexagon.

6. The column according to claim 2 wherein, viewed in said axial direction, the cross-section of each segment is a trapezoid.

7. The column according to claim 2 wherein the packing sheets in at least some segments in a band extend parallel to the adjacent side of the core.

8. The column according to claim 7 wherein the packing sheets in all segments in a band extend parallel to the adjacent side of the core.

9. The column according to claim 2 wherein the packing sheets in at least some segments in a band extend perpendicular to the adjacent side of the core.

10. The column according to claim 9 wherein the packing sheets in alternate segments in a band extend parallel to the adjacent side of the core and the packing in the intervening segments in the band extend perpendicular to the adjacent side of the core.

11. The column according to claim 1 wherein each segment of a band is identical with the complementary segments of the band.

12. The column according to claim 1 wherein each segment of a band is bounded at its sides by an axially extending peripheral wall.

13. The column according to claim 1 wherein, viewed in said axial direction, the packing sheets in the body of the layer are arranged in a plurality of abutting said sections.

14. The column according to claim 1 wherein, viewed in said axial direction, the packing sheets in the body of the layer are arranged in a single said section.

15. The column according to claim 1 wherein there are two or more said bands concentrically surrounding said core.

16. The column according to claim 1 wherein there are two or more said layers angularly orientated so that the segments of each layer are not axially aligned with the corresponding segments of the adjacent layer(s).

17. The column according to claim 16 wherein, viewed in said axial direction, the packing sheets in the body of each layer are arranged in a plurality of abutting said sections and the centers of at least some cores of each layer are coaxially aligned with centers of cores in the adjacent layer(s).

18. In a liquid-vapor contact column comprising a hollow column packed with at least one layer formed of a plurality of structured packing sheets orientated to provide liquid-vapor contact in the axial direction of the column, the improvement consisting in that, viewed in the axial direction of the column, packing sheets in the body of each layer are arranged in a plurality of abutting sections in each of which sections at least one band surrounds a central regular polygonal core, said band being formed of segments of trapezoidal cross-section identical with the complementary segments of the band and in which the packing sheets in each segment extend rectilinearly in a different direction to those in the adjacent segments of the band.

19. The column according to claim 18 wherein the packing sheets in all segments extend parallel to the adjacent side of the core.

20. The column according to claim 18 wherein there are two or more said bands concentrically surrounding said core.

21. The column according to claim 18 wherein the centers of at least some cores of each layer are coaxially aligned with the centers of cores in the adjacent layer(s).

22. In a liquid-vapor contact column comprising a hollow column packed with at least one layer formed of a plurality of structured packing sheets orientated to provide liquid-vapor contact in the axial direction of the column, the improvement consisting in that, viewed in the axial direction of the column, packing sheets in each layer are arranged in one or more bands concentrically surrounding a central regular polygonal core, said band being formed of segments of trapezoidal cross-section identical with the complementary segments of the band and in which the packing sheets in each segment extend rectilinearly in a different direction to those in the adjacent segments in the band.

23. The column according to claim 22 wherein the packing sheets in all segments extend parallel to the adjacent side of the core.

24. The column according to claim 22 wherein there are two or more said bands concentrically surrounding said core.

25. In a liquid-vapor contact column comprising a hollow column packed with at least one layer formed of a plurality of structured packing sheets orientated to provide liquid-vapor contact in the axial direction of the column, the improvement consisting in that, viewed in the axial direction of the column, packing sheets in each layer are arranged in two or more bands concentrically surrounding a central regular hexagonal core, all said bands being formed of identical segments of irregular hexagonal cross-section symmetrical about a radial direction from the core center.

26. The column according to claim 25 wherein the packing sheets extends in a peripheral direction relative to the core.

27. In a liquid-vapor contact column comprising a hollow column packed with at least one layer formed of a plurality of structured packing sheets orientated to provide liquid-vapor contact in the axial direction of the column, the improvement consisting in that, viewed in the axial direction of the column, packing sheets in each layer are arranged in one or more bands concentrically surrounding a central regular polygonal core having an even number of sides, said band being formed of segments of trapezoidal cross-section alternating with segments of rectangular cross-section, said trapezoidal segments being identical with the other trapezoidal segments of the band and having the packing sheets extending parallel to the sides of the core, and said rectangular segments being identical with the other rectangular segments of the band and having packing sheets extending perpendicular to the sides of the core.

28. The column according to claim 27 wherein there are two or more said bands concentrically surrounding said core.

* * * * *